(12) United States Patent
Selder et al.

(10) Patent No.: US 8,079,809 B2
(45) Date of Patent: Dec. 20, 2011

(54) INFLATABLE SEAL ASSEMBLY BETWEEN AN ENGINE INLET AND A VEHICLE

(75) Inventors: Al Selder, Gilbert, AZ (US); Raymond A. Sutyak, Queen Creek, AZ (US); Donald R. Piscopo, Phoenix, AZ (US); Joseph A. Olsen, III, Glendale, AZ (US); Marc Schmittenberg, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 841 days.

(21) Appl. No.: 12/147,146

(22) Filed: Jun. 26, 2008

(65) Prior Publication Data

US 2009/0320441 A1 Dec. 31, 2009

(51) Int. Cl.
*F01D 25/24* (2006.01)
(52) U.S. Cl. .................. 415/214.1; 60/799; 60/39.092; 277/596; 415/121.2; 415/174.2; 415/110
(58) Field of Classification Search ............. 415/214.1, 415/121.2, 174.2; 277/596; 60/39.092, 799
See application file for complete search history.

(56) References Cited

U.S. PATENT DOCUMENTS

| 3,302,396 | A | | 2/1967 | Robbins | |
|---|---|---|---|---|---|
| 3,591,963 | A | | 7/1971 | Kopp | |
| 4,228,753 | A | | 10/1980 | Davis et al. | |
| 4,573,827 | A | | 3/1986 | Mayo, Jr. | |
| 4,670,062 | A | | 6/1987 | Lester | |
| 5,107,675 | A | | 4/1992 | Roberts | |
| 5,125,796 | A | * | 6/1992 | Cromer | 415/174.2 |
| 5,222,692 | A | * | 6/1993 | Glowacki | 244/53 R |
| 5,480,161 | A | * | 1/1996 | Borowski | 277/419 |
| 5,706,648 | A | | 1/1998 | Porte et al. | |
| 6,623,238 | B2 | * | 9/2003 | Langston et al. | 415/112 |
| 6,899,513 | B2 | | 5/2005 | Eleftheriou | |
| 7,097,136 | B2 | * | 8/2006 | Ruszkowski, Jr. | 244/105 |
| 7,931,061 | B2 | * | 4/2011 | Gonska et al. | 152/417 |
| 2002/0067005 | A1 | * | 6/2002 | Bock | 277/591 |

* cited by examiner

*Primary Examiner* — Thao Le
*Assistant Examiner* — Sheng Zhu
(74) *Attorney, Agent, or Firm* — Ingrassia Fisher & Lorenz, P.C.

(57) ABSTRACT

An inflatable sealing assembly for sealing between an intake section of a turbine engine and an air inlet ring of a vehicle. The inflatable sealing assembly including a seal holder coupled to the intake section of the engine and having a first inflatable seal, a second inflatable seal, and a closed cell foam material disposed therein. The first inflatable seal and the second inflatable seal are configured when inflated to provide a seal between the intake section of the turbine engine and the air inlet ring of the vehicle and prevent foreign object debris and/or water from entering the turbine engine.

20 Claims, 5 Drawing Sheets

US 8,079,809 B2

INFLATABLE SEAL ASSEMBLY BETWEEN AN ENGINE INLET AND A VEHICLE

STATEMENT REGARDING FEDERALLY SPONSORED RESEARCH OR DEVELOPMENT

This invention was made with Government support under contract number W56HZV-06-C-0173 awarded by the U.S. Army. The Government has certain rights in this invention.

TECHNICAL FIELD

The present invention generally relates to a seal assembly used to eliminate or minimize foreign object and water ingestion damage to an engine, and more particularly to a seal assembly configured to sealingly engage an engine to a vehicle filtration system.

BACKGROUND

Various types of vehicles, such as jet airplanes, helicopters, tanks or boats utilize turbine engines as a primary power source for locomotion. Turbine engines may include a compressor section, in which inlet air is compressed, followed by a combustor section in which fuel is combusted with the compressed air to generate exhaust gas. The exhaust gas is then directed to a turbine section, where energy is extracted from the exhaust gas. The compressor section and the turbine typically include multiple disks connected to a common bearing and/or shaft.

Turbine engines that operate in dusty, dirty and/or partially submerged environments may experience severe erosion or other damage, especially of the compressor and turbine components. This is commonly referred to as foreign object damage (FOD). In addition to causing erosion of compressor and turbine blades, vanes and shrouds, foreign objects, such as sand and dust, can clog turbine cooling passages and blade attachments. Water ingestion may cause corrosion of turbine engine components and may extinguish the combustion process. In a typical engine design, the compressor may experience foreign object damage (FOD) and/or water ingestion damage due to a poor seal design between an engine inlet and a vehicle air plenum/filtration system. Current seals include a convoluted molded rubber component that interfaces with the engine with an interference, or press, fit. More specifically, the current seal design requires that the parts be pushed together, rather than by other means of fastening, often resulting in an inadequate seal. In addition, the inability to obtain an adequate seal between the engine and vehicle filtration system is exacerbated by being a blind assembly and during the connection process the engine comes in at an angle. Because of the interference fit, alignment, and blind access, the seal is often not properly engaged. This improper engagement results in a gap between the engine and the air filtration system which allows water and/or debris to enter the engine during operation that may result in a FOD or water ingestion event.

Hence, there is a need for a sealing assembly between an engine inlet and a vehicle filtration system that minimizes the entrance of any foreign objects and/or water into the engine. In addition, there is a need for a sealing assembly that provides a robust positive seal that during assembly can be properly aligned and engaged during a blind assembly process.

BRIEF SUMMARY

The present invention provides a seal assembly for sealing between an engine and an air inlet of a vehicle, the engine having an inlet and the air inlet having an inner diameter and an outer diameter, the seal assembly includes a seal holder, a first inflatable seal, a second inflatable seal and a closed cell foam material. The seal holder is configured for coupling to the inlet of the engine. The first inflatable seal is disposed within the seal holder. The second inflatable seal is disposed within the seal holder. The closed cell foam material is disposed within the seal holder. The first inflatable seal and the second inflatable seal provide a seal when positioned about the inner diameter and the outer diameter of the air inlet of the vehicle.

In another particular embodiment, and by way of example only, the seal assembly includes a seal holder, a first inflatable seal formed of an elastomer material, a second inflatable seal formed of an elastomer material and a silicone based closed cell foam material. The seal holder is configured for coupling to the intake section of the turbine engine. The first inflatable seal is disposed within the seal holder, adjacent an inner diameter of the air inlet ring. The second inflatable seal is disposed within the seal holder, adjacent an outer diameter of the air inlet ring. The silicone based closed cell foam material is disposed within the seal holder and adjacent a face of the air inlet ring. The first inflatable seal and the second inflatable seal when inflated provide a seal between the intake section of the turbine engine and the air inlet ring of the vehicle and prevent foreign object debris from entering the turbine engine.

In yet another particular embodiment, and by way of example only, the seal assembly includes an inflatable sealing means for sealing between an intake section of a turbine engine and an air inlet ring of a vehicle. The inflatable sealing means includes a seal holder, a first inflatable seal formed of an elastomer mater, a second inflatable seal formed of an elastomer material, a silicone based closed cell foam material, and an air conduit. The seal holder is configured for coupling to the intake section of the turbine engine. The first inflatable seal is disposed within the seal holder, adjacent an inner diameter of the air inlet ring. The second inflatable seal is disposed within the seal holder, adjacent an outer diameter of the air inlet ring. The silicone based closed cell foam material is disposed within the seal holder and adjacent a face of the air inlet ring. The air conduit is inn fluidic communication with the first inflatable seal, the second inflatable seal, an inflation air source and the turbine engine. The first inflatable seal and the second inflatable seal when inflated provide a seal between the intake section of the turbine engine and the air inlet ring of the vehicle and prevent foreign object debris from entering the turbine engine.

Other independent features and advantages of the preferred seal assembly between an engine inlet and a vehicle filtration system will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, although the present embodiment is, for ease of explanation, depicted and described as being implemented in a vehicle, such as an aircraft, land vehicle, water vehicle, or the like it will be appreciated that it can be implemented in various other systems and environments.

Figure 1:
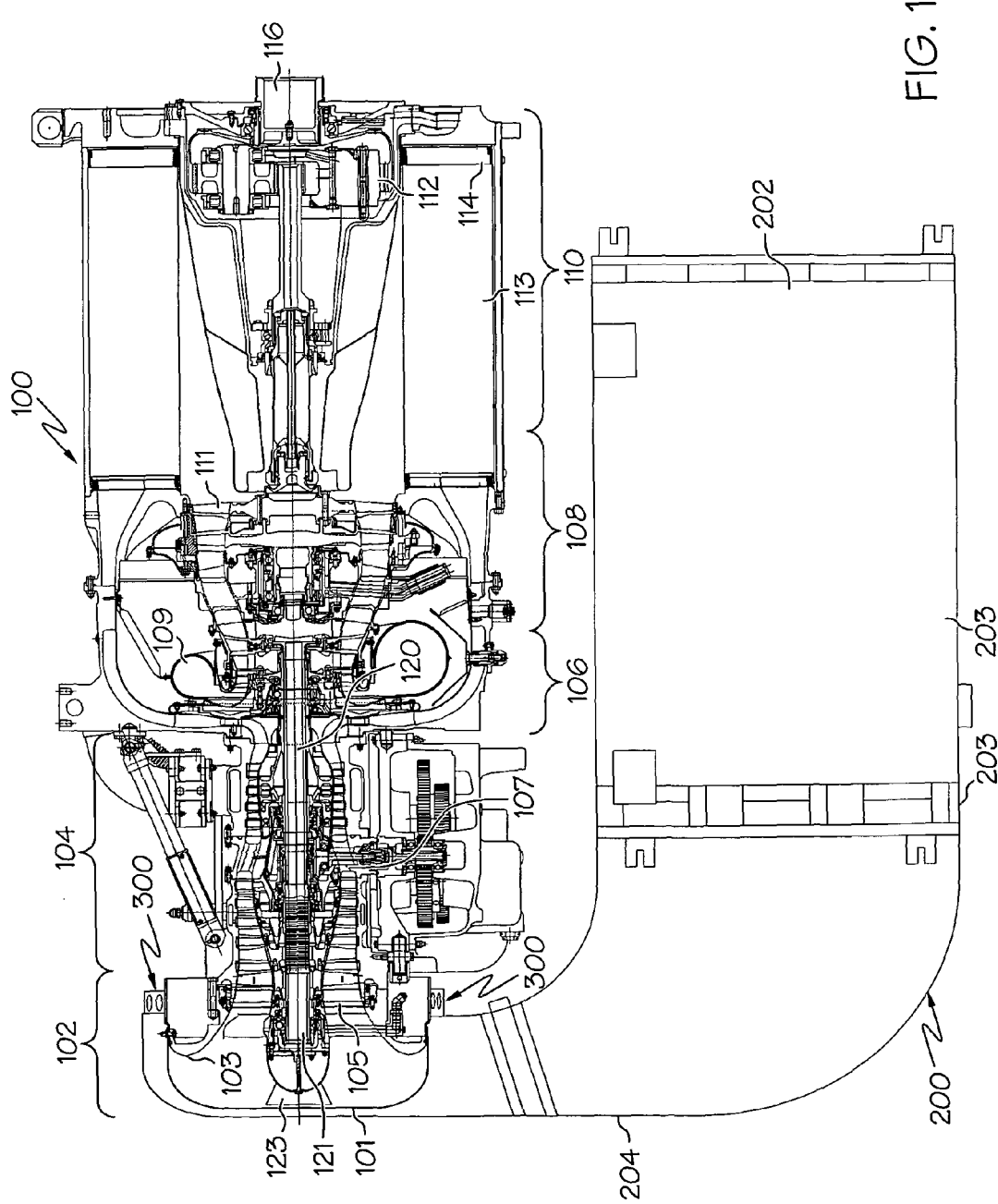
FIG. 1 is a simplified cross-section of a turboshaft engine coupled to a portion of a vehicle according to an exemplary embodiment.
Figure 2:
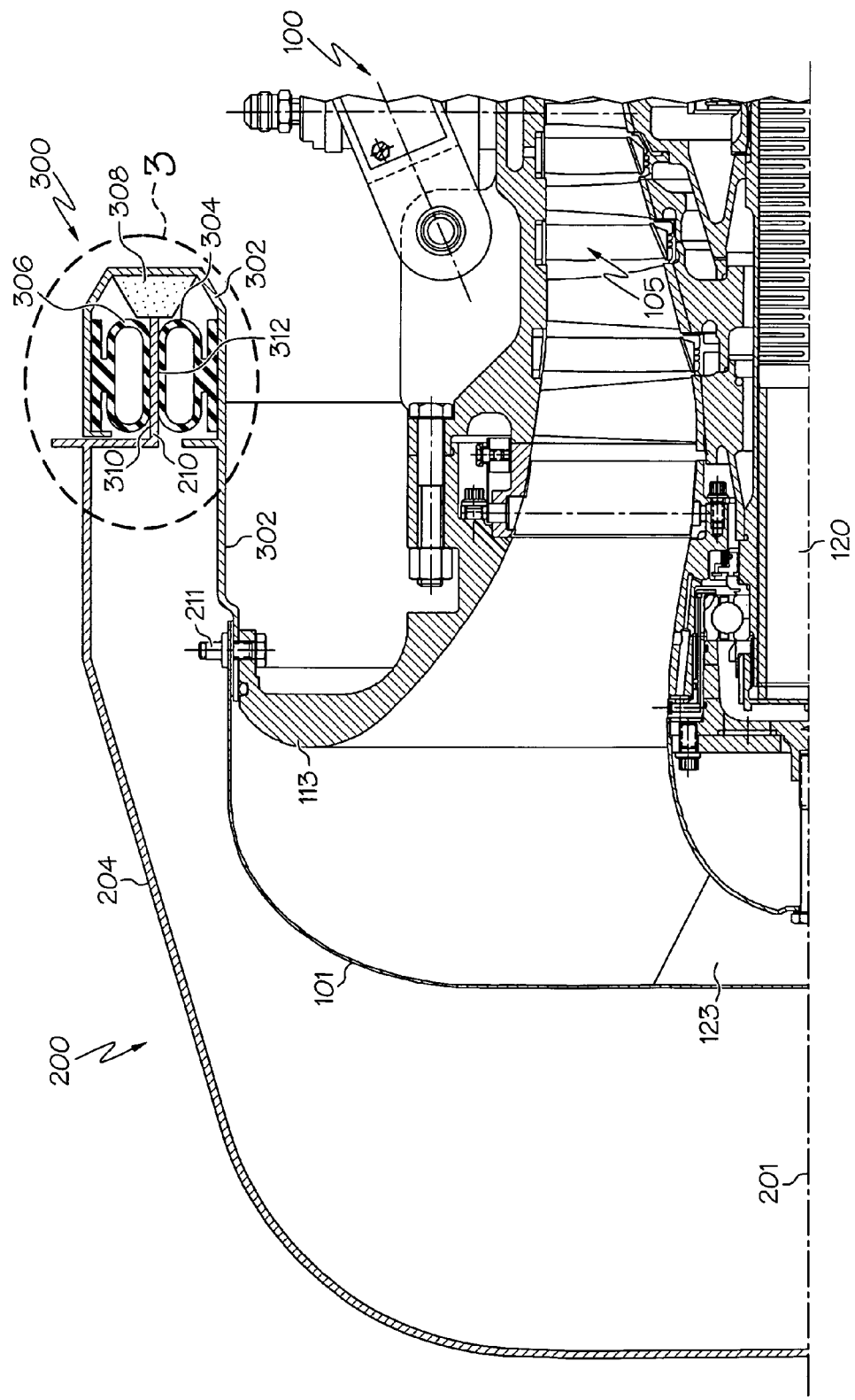
FIG. 2 is a simplified cross-section of a portion of the turboshaft engine coupled to the vehicle filtration system of FIG. 1 including a sealing assembly according to an exemplary embodiment.

Referring now to FIGS. 1 and 2, illustrated in FIG. 1 is an exemplary embodiment of a turbine engine, which in this particular embodiment is a turboshaft engine 100, coupled to a portion of a vehicle 200. FIG. 2 illustrates a close up cross-section side view of the turboshaft engine 100, and more particularly an air intake section 102, coupled to an air inlet plenum 204 of the vehicle 200 via a seal assembly 300. In FIG. 2, only half the structure is shown, it being substantially rotationally symmetric about a centerline and axis of rotation 201. In the depicted embodiment, the turboshaft engine 100 is comprised of multiple components, including an intake section 102, a compressor section 104, a combustion section 106, a turbine section 108, and an exhaust section 110. The turboshaft engine 100, and more particularly the intake section 102 includes a screen 101, air splitter 123 and an engine inlet bell 103. The compressor section 104 includes both a multi-stage low pressure compressor 105 interconnected by a rotary power shaft 121 and a multi-stage high pressure compressor 107 interconnected by a rotary power shaft 120. The rotary power shafts 120 and 121 interconnect the low pressure compressor 105 and the high pressure compressor 107 in torque transmitting relationships with their respective turbine rotors. In general, the combustion section 106 includes a combustor 109, the turbine section 108 includes a plurality of turbines 111, and the exhaust section 110 includes a recuperator 113.

The vehicle 200 is also comprised of multiple components, including an air inlet 202, an air pre-cleaner and filter 203, and the air inlet plenum 204. During operation, air is drawn into a top portion of the vehicle filtration system via the air inlet 202 through the air pre-cleaner and filter 203 into the air inlet plenum 204. The air flows through the air inlet plenum 204 toward the turboshaft engine 100. The air next enters the turboshaft engine 100 through the screen 101 and diverted by the splitter 123 into the inlet bell 103. The air is compressed in the compressor section 104 through the multi-stage low pressure compressor 105 and the multi-stage high pressure compressor 107. The low pressure compressor 105 raises the pressure of the air directed into it from the intake section 102, and directs the compressed air into the high pressure compressor 107. The high pressure compressor 107 compresses the air still further, and directs the high pressure air into the combustion section 106. Prior to passing to the combustion section 106, the air passes through the recuperator 113 to pick up any waste heat from the exhaust section 110. The heated air then flows into the combustor 109 where fuel is added and burned. The hot gas next goes through the high pressure and low pressure turbines 111 in the turbine section 108 and through a power turbine which is connected to a reduction gearbox 112. The gas finally exits the turbine section into a recuperator inlet 114 and then exits the turboshaft engine 100 back to ambient air. The output power exits toward the vehicle 200 transmission via an engine output shaft 116.

Referring more specifically to FIG. 2, illustrated is an enlarged view of a forward portion of the turboshaft engine 100 coupled to the vehicle 200, and more particularly the vehicle filtration system. The engine 100 is coupled to the vehicle via the seal assembly 300. The air inlet plenum 204 includes an inlet ring 210, also referred to as an inlet plenum lip that provides for coupling of the turboshaft engine 100 to the vehicle 200.

Figure 3:
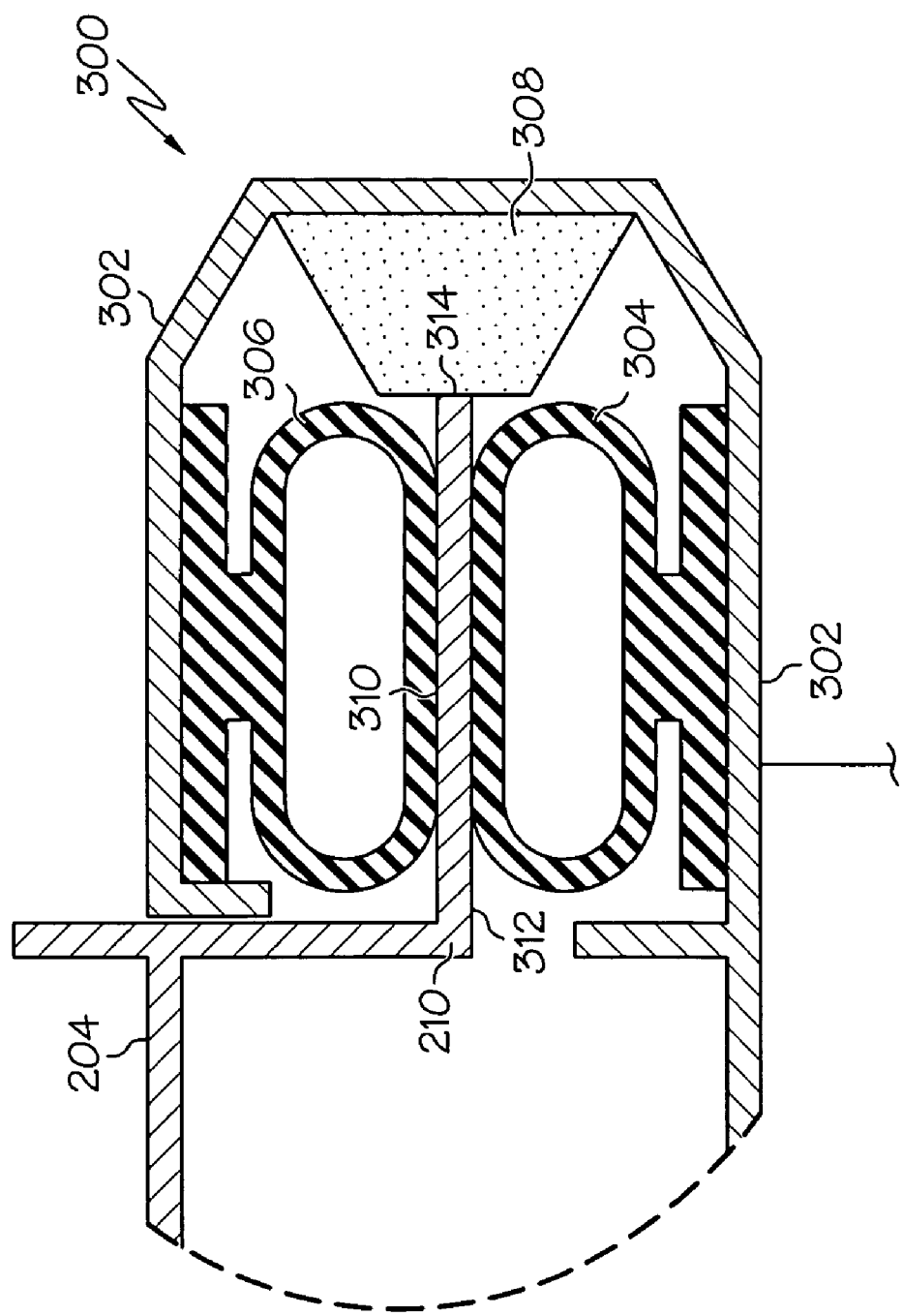
FIG. 3 is a simplified cross-section of the sealing assembly of FIG. 2 positioned between an engine inlet and a vehicle filtration system, the sealing assembly being illustrated in an inflated state.

Referring now to FIG. 3, illustrated is a close-up cross-sectional view indicated by the dotted line in FIG. 2, of the seal assembly 300. To provide for coupling of the turboshaft engine 100 to the vehicle 200, the seal assembly 300 is made up of multiple components, including a seal holder 302, a first inflatable seal 304, a second inflatable seal 306 and a closed cell foam 308. The first and second inflatable seals 304 and 306 provide for a seal about an outer diameter 310 of the inlet ring 210 and an inner diameter 312 of the inlet ring 210, respectively. In the illustrated embodiment, the seal holder 302 is positioned relative to the turboshaft engine 100 and mounted to the inlet bell 103 via a fastening means 211, such as a bolt, welding joint, or the like, as best illustrated in FIG. 2. When the turboshaft engine 100 and the vehicle 200 are positioned for coupling together, the seal holder 302 is properly positioned relative to the inlet ring 210. The first and second inflatable seals 304 and 306 are preferably formed of an elastomer material, such as rubber or silicone. In addition, the first and second inflatable seals 304 and 306 retain their shape through inflation and deflation. The first and second inflatable seals 304 and 306 are inflated after being positioned, to form a seal between the inner diameter 312 of the inlet ring 210 and the first inflatable seal 304 and between the outer diameter 314 of the inlet ring 210 and the second inflatable seal 306.

The closed cell foam 308 is positioned within the seal assembly 300 during fabrication of the seal assembly 300. The foam 308 is preferably a closed cell material to minimize absorption of any engine fluids. The closed cell foam 308 may be formed within the seal assembly 300 in any shape, including rectangular, triangular, or the like. After proper positioning of the seal assembly 300 relative to the air inlet plenum 204, the closed cell foam 308 provides for initial sealing prior to inflation of the first and second inflatable seals 304 and 306 or after long term storage seal bleed down. The closed cell foam 308 is in contact with an inlet ring face 314 to provide for this initial sealing.

Figure 4:
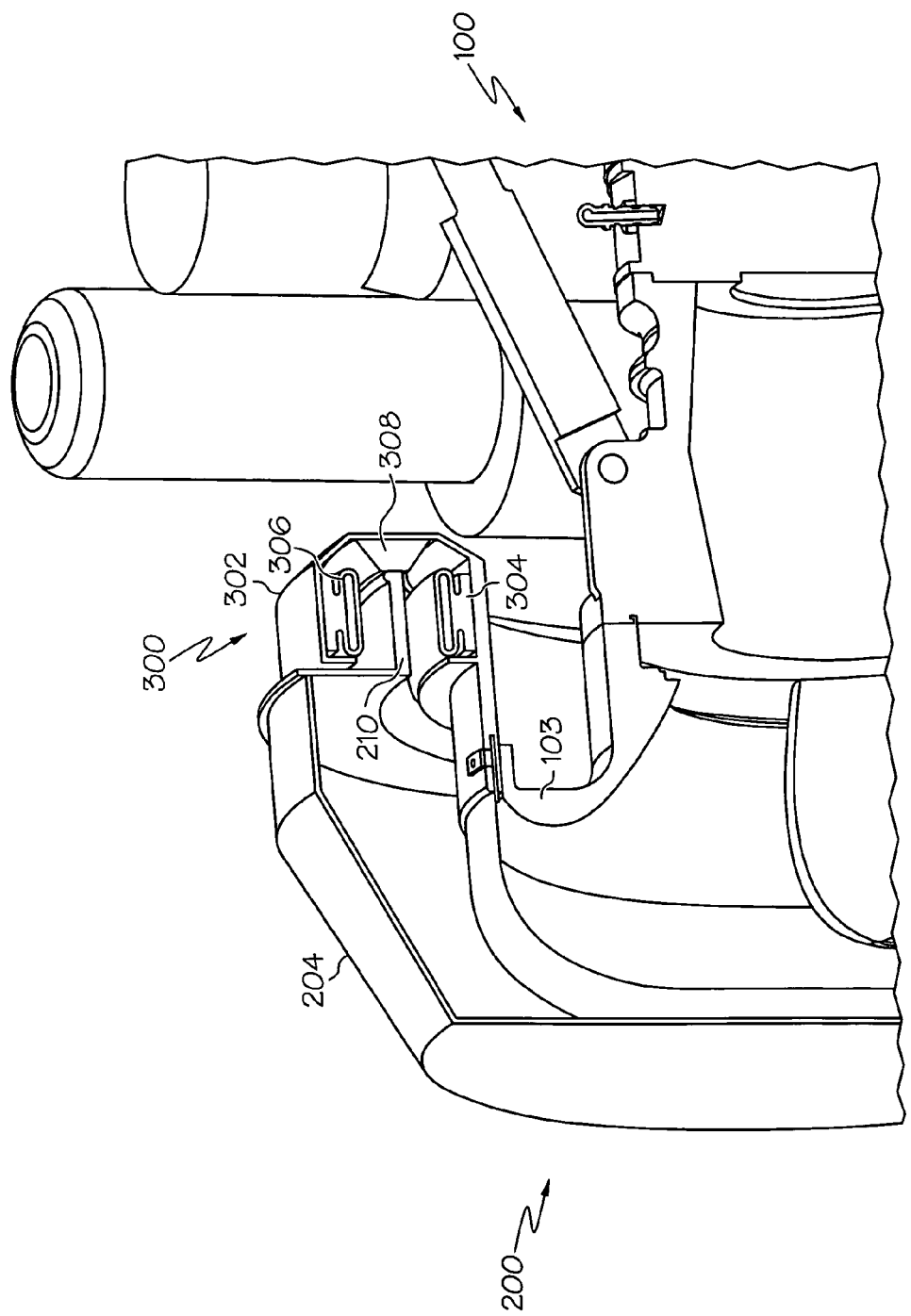
FIG. 4 is a simplified representation of the sealing assembly of FIG. 2 positioned between an engine inlet and a vehicle filtration system, the sealing assembly being illustrated in a deflated state.

FIG. 4 illustrates in a simplified isometric view, the proper positioning of the seal assembly 300, and more particularly the seal holder 302, prior to inflation of the first and second inflatable seals 304 and 306. In addition to providing for an initial seal, the closed cell foam 308, in the unlikely event of a first or second seal 304 or 306 failure, acts as a backup seal. Accordingly, after the first and second inflatable seals 304 and 306 are inflated, a tri-seal is provided between the turboshaft engine 100 and the air inlet plenum 204 of the vehicle 200 comprised of the first inflatable seal 304, the second inflatable seal 306 and the closed cell foam 308. This tri-seal assembly eliminates any gap between the turboshaft engine 100 and the vehicle 200 through which debris and/or water may enter the engine 100.

Figure 5:
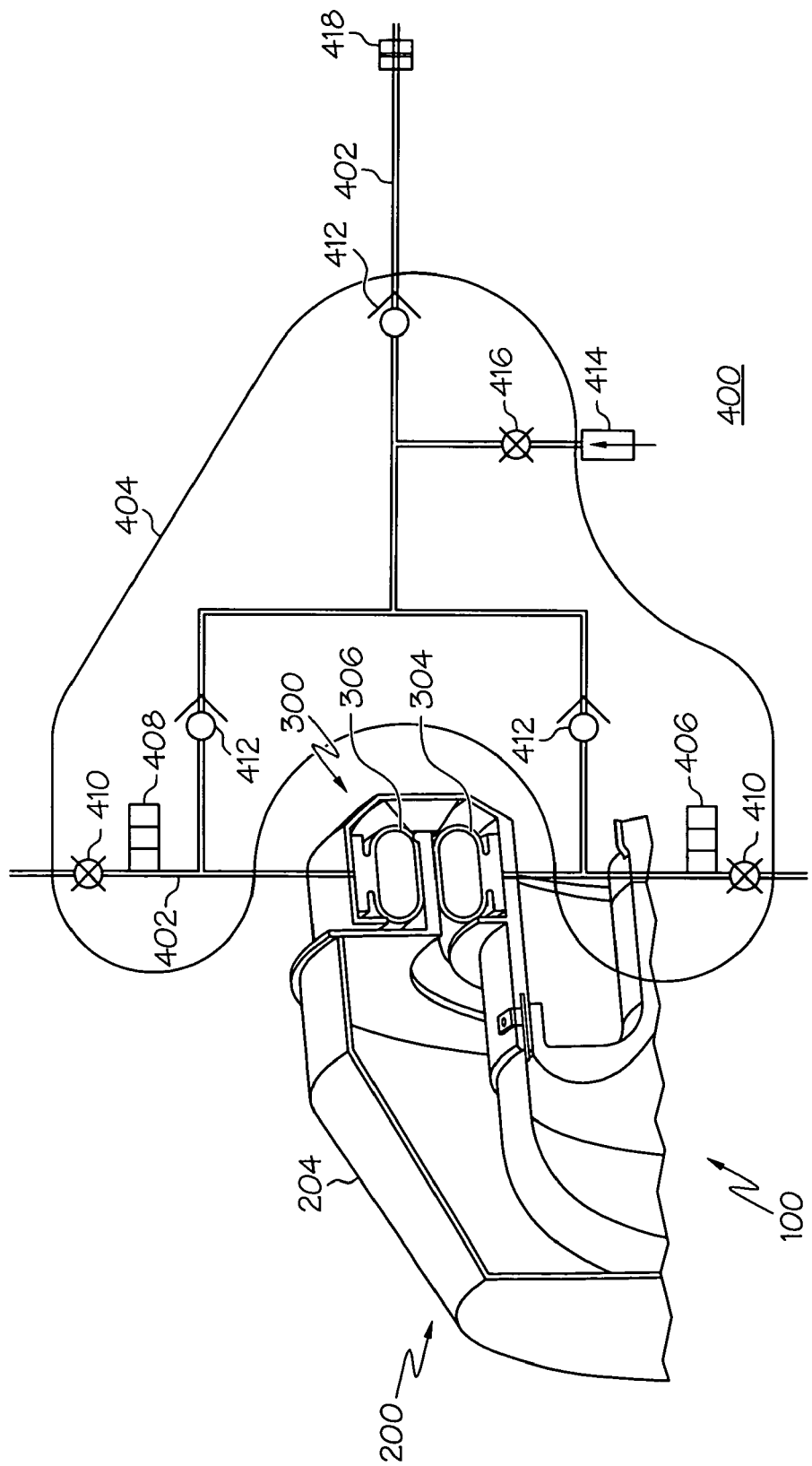
FIG. 5 is a simplified schematic plumbing diagram for the seal assembly of FIGS. 1-4 according to an exemplary embodiment.

To inflate the first inflatable seal 304 and the second inflatable seal 306 the turboshaft engine 100, a pump or a compressed air source may be used as an air inflation source. Referring now to FIG. 5, illustrated is a schematic plumbing diagram 400 for inflation of the seal assembly 300 using the turboshaft engine 100, according to an exemplary embodiment. Prior to installing the turboshaft engine 100 onto the vehicle 200, the first inflatable seal 304 and the second inflatable seal 306 are fully deflated. After the turboshaft engine 100 is in place relative to the vehicle 200, the engine 100 is started and accelerated to full speed to inflate the first inflatable seal 304 and the second inflatable seal 306 to a gauge pressure of approximately 15 psig. It should be understood that this pressure may vary from installation to installation. The closed cell foam 308 is positioned adjacent the inlet ring face 314 and thus provides adequate initial sealing for this inflation step, in that the vehicle 200 will not be moving. The engine source of air maintains inflation in the first inflatable seal 304 and the second inflatable seal 306 during operation. When it is desired to remove the turboshaft engine 100 for repair, maintenance, or the like, the inflation air is vented via a vent valve to deflate the first inflatable seal 304 and the second inflatable seal 306, allowing the turboshaft engine 100 to be easily removed from the vehicle 200.

In another alternate method of inflating the first inflatable seal 304 and the second inflatable seal 306, subsequent to positioning of the turboshaft engine 100 relative to the vehicle 200, a hand pump or shop compressed air source it used to inflate the first inflatable seal 304 and the second inflatable seal 306 to a gauge pressure of approximately 15 psig. As previously described, an engine source of air will keep the first inflatable seal 304 and the second inflatable seal 306 inflated during operation.

To achieve inflation according to the above described inflation method, an air conduit 402, also referred to as a flex line, is provided in fluidic communication with the first inflatable seal 304 and the second inflatable seal 306. The air conduit 402 is preferably mounted within an aluminum box, a portion which is represented as 404, proximate the turboshaft engine 100. The air conduit 402 includes a first visual indicator 406 in communication with the first inflatable seal 304, and a second visual indicator 408 in communication with the second inflatable seal 306. A plurality of vent valves 410 and check valves 412 are provided in the air conduit 402 for each of the first and second inflatable seals 304 and 306. Fill air from one of a pump, compressed air, or engine is provided via a valve 414, such as an automotive type Schrader valve or alternate fitting. In addition, a fill valve 416 is closed after setting the seal pressure. An orifice 418 is provided to limit flow from the engine, such as the turboshaft engine 100 of FIGS. 1-4, thus maintaining inflation during operation and limit air flow in the event of a downstream seal leak.

As previously identified, the seal assembly 300 provides for sealing between the turboshaft engine 100 and a vehicle 200 filtration system. The seal assembly 300 provides a tri-seal between the two components with the first inflatable seal 304, the second inflatable seal 306 and the closed cell foam 308. The seal assembly 300 eliminates or minimizes the amount of debris and/or water that may be allowed to enter the turboshaft engine 100 during operation.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention.

What is claimed is:

1. A seal assembly for sealing between an engine and an air inlet of a vehicle, the engine having an inlet and the air inlet having an inner diameter and an outer diameter, the seal assembly comprising:
    a seal holder configured for coupling to the inlet of the engine;
    a first inflatable seal disposed within the seal holder;
    a second inflatable seal disposed within the seal holder; and
    a closed cell foam material disposed within the seal holder and contacting a face of the air inlet,
    wherein the first inflatable seal and the second inflatable seal provide a seal when positioned and thereafter inflated about the inner diameter and the outer diameter of the air inlet of the vehicle.

2. The seal assembly of claim 1, wherein the first inflatable seal and the second inflatable seal are formed of an elastomer material.

3. The seal assembly of claim 2, wherein the elastomer material is a rubber material.

4. The seal assembly of claim 2, wherein the elastomer material is a silicone material.

5. The seal assembly of claim 1, wherein the first inflatable seal and the second inflatable seal are configured to retain their shape.

6. The seal assembly of claim 1, wherein the closed cell foam material minimizes absorption of an engine fluid.

7. The seal assembly of claim 1, wherein the closed cell foam material is substantially rectangular in form.

8. The seal assembly of claim 1, wherein the closed cell foam material is substantially triangular in form.

9. The seal assembly of claim 1, further including an air conduit in fluidic communication with the first inflatable seal, the second inflatable seal, an inflation air source and the engine.

10. The seal assembly of claim 9, wherein the inflation air source is a pump, a compressed air source or the engine.

11. The seal assembly of claim 9, wherein the air conduit is provided with at least one of a visual pressure indicator, a vent valve, a fill valve, and a check valve.

12. An inflatable sealing means for sealing between an intake section of a turbine engine and an air inlet ring of a vehicle, the inflatable sealing means comprising:
    a seal holder configured for coupling to the intake section of the turbine engine;
    a first inflatable seal formed of an elastomer material and disposed within the seal holder, adjacent an inner diameter of the air inlet ring;
    a second inflatable seal formed of an elastomer material and disposed within the seal holder, adjacent an outer diameter of the air inlet ring; and
    a closed cell foam material disposed within the seal holder and contacting a face of the air inlet ring,
    wherein the first inflatable seal and the second inflatable seal when inflated provide a seal between the intake section of the turbine engine and the air inlet ring of the vehicle and prevent foreign object debris or water from entering the turbine engine.

13. The inflatable sealing means of claim 12, wherein the elastomer material is a rubber material.

14. The inflatable sealing means of claim 12, wherein the elastomer material is a silicone material.

15. The inflatable sealing means of claim 12, wherein the first inflatable seal and the second inflatable seal are configured to retain their shape when deflated without the need for reinforcement.

16. The inflatable sealing means of claim 12, further including an air conduit in fluidic communication with the first inflatable seal, the second inflatable seal, an inflation air source and the turbine engine.

17. The inflatable sealing means of claim 16, wherein the inflation air source is at least one of a pump, a compressed air source or the turbine engine.

18. The inflatable sealing means of claim 16, wherein the air conduit is provided with at least one of a visual pressure indicator, a vent valve, a fill valve, and a check valve.

19. An inflatable sealing means for sealing between an intake section of a turbine engine and an air inlet ring of a vehicle, the inflatable sealing means comprising:
   a seal holder configured for coupling to the intake section of the turbine engine;
   a first inflatable seal formed of an elastomer material and disposed within the seal holder, adjacent an inner diameter of the air inlet ring;
   a second inflatable seal formed of an elastomer material and disposed within the seal holder, adjacent an outer diameter of the air inlet ring;
   a closed cell foam material disposed within the seal holder and contacting a face of the air inlet ring; and
   an air conduit in fluidic communication with the first inflatable seal for inflation thereof, the second inflatable seal for inflation thereof, an inflation air source and the turbine engine,
   wherein the first inflatable seal and the second inflatable seal when inflated provide a seal between the intake section of the turbine engine and the air inlet ring of the vehicle and prevent foreign object debris or water from entering the turbine engine.

20. The inflatable sealing means of claim 19, wherein the inflation air source is at least one of a pump, a compressed air source, or the turbine engine and the air conduit is provided with at least one of a visual pressure indicator, a vent valve, a fill valve, and a check valve.

* * * * *